US008361188B2

(12) United States Patent  (10) Patent No.: US 8,361,188 B2
Santhanam et al. (45) Date of Patent: Jan. 29, 2013

(54) METHODS FOR PREPARING METAL AND METAL OXIDE NANOPARTICLES

(75) Inventors: Venugopal Santhanam, Bangalore (IN); Sankar Kalidas Sivaraman, Madurai (IN)

(73) Assignee: Indian Institute of Science, Karnataka (IN)

(*) Notice: Subject to any disclaimer, the term of this patent is extended or adjusted under 35 U.S.C. 154(b) by 726 days.

(21) Appl. No.: 12/550,210

(22) Filed: Aug. 28, 2009

(65) Prior Publication Data

US 2010/0251856 A1   Oct. 7, 2010

(30) Foreign Application Priority Data

Apr. 3, 2009 (IN) .............................. 775/CHE/2009

(51) Int. Cl.
*B22F 9/24* (2006.01)
(52) U.S. Cl. .............................. 75/371; 423/592; 977/896
(58) Field of Classification Search ........................ None
See application file for complete search history.

(56) References Cited

U.S. PATENT DOCUMENTS

| 2006/0003097 | A1 | 1/2006 | Andres | |
| 2007/0056402 | A1* | 3/2007 | Cho et al. | 75/362 |
| 2007/0249747 | A1* | 10/2007 | Tsuji et al. | 522/3 |
| 2008/0087137 | A1* | 4/2008 | Shim et al. | 75/331 |
| 2010/0143183 | A1* | 6/2010 | Martinez Martinez et al. | 420/501 |

FOREIGN PATENT DOCUMENTS

| TW | 273237 B | 2/2007 |
| WO | WO-2008/075933 A1 * | 6/2008 |

OTHER PUBLICATIONS

Daniel, M.G. and Astruc, D., "Gold Nanoparticles: Assembly Supramolecular Chemistry, Quantum-Size-Related Properties Applications Toward Biology, Catalysis, and Nanotechnology," Chem. Rev. 2004, vol. 104, pp. 293-346.
Slot, J.W. and Geuze, H. J., "A New Method of Preparing Gold Probes for Multiple-Labeling Cytochemistry," European Journal Cell Biol. 1985, vol. 38, pp. 87-93.
Pellegrino, Teresa; Kudera, Stefan; Liedl, Tim; Javier, Almudena Muñoz; Manna Dr., Liberato and Parak Dr., Wolfang J., "On the Development of Colloidal Nanoparticles towards Multifunctional Structures and their Possible Use for Biological Applications", Small, Jan. 2005, vol. 1(1), pp. 48-63.
Turkevich, John; Stevenson, Peter Cooper and Hiller, James, "A Study of the Nucleation and Growth Processes in the Synthesis of Colloidal Gold", Discussions of the Faraday Society, 1951, vol. 11, pp. 55-75.
www.bbigold.com accessed on Jun. 21, 2008, pp. 1-1.
Raveendran P., Fu J. and Wallen S.L., "A Simple and "Green" Method for the Synthesis of Au, Ag, and Au-Ag Alloy Nanoparticles", Green Chem, 2006, vol. 8, Issue 1, pp. 34-38. doi: 10.1039/b512540e.

* cited by examiner

*Primary Examiner* — George Wyszomierski
(74) *Attorney, Agent, or Firm* — Steven S. Rubin, Esq.; Moritt Hock & Hamroff LLP

(57) ABSTRACT

Metal and metal oxide nanoparticles can be prepared via a simple synthesis by using a hydrolysable gallotannin, such as tannic acid, to reduce a metal precursor compound and to act as a stabilizer for the resultant nanoparticles. By controlling the molar ratio of hydrolysable gallotannin to metal precursor and/or the initial pH of the reagents one can achieve control over the size and polydispersity of the resultant nanoparticles. In particular, the controlled addition of a metal precursor into a solution of the hydrolysable gallotannin, as described herein, can yield small nanoparticles, for example 1 nm to 40 nm diameter nanoparticles, with low polydispersity. The methods disclosed herein can be performed at room temperature.

20 Claims, 9 Drawing Sheets

METHODS FOR PREPARING METAL AND METAL OXIDE NANOPARTICLES

CROSS-REFERENCE TO RELATED APPLICATION

The present application claims priority under 35 U.S.C. §119(d) to a corresponding patent application filed in India and having application number 775/CHE/2009, filed on Apr. 3, 2009, the entire contents of which are herein incorporated by reference.

FIELD OF THE INVENTION

The present application relates to methods for producing metal or metal oxide nanoparticles in the presence of a hydrolysable gallotannin, such as tannic acid, which can function as both a reductant and stabilizer.

BACKGROUND OF THE INVENTION

Nanoparticles have sparked interest and excitement among the research community in the last decade. Gold nanoparticles, in particular, have potential applications in various fields like catalysis, biomedical engineering, energy conversion, electronics, photonics, sensors etc. To harness the novel properties of gold nanoparticles it is essential to have a synthesis route that has control over size, shape and polydispersity.

Many routes for producing nanoparticles are solution-based redox reactions, commonly referred to as wet synthesis. Widely used methods for aqueous phase synthesis of gold nanoparticle involve the reduction of chloroauric acid with i) trisodium citrate, or ii) a mixture of tannic acid and trisodium citrate that forms nanoparticles with mean size ranging from 3.5 nm to 16 nm depending on the amount of tannic acid with respect to citrate. It has been reported that lower pH of reducing agent results in bigger nanoparticles. Protocols are performed at elevated temperature, viz. 100° C. and 60° C. respectively.

Other protocols for synthesizing nanoparticles at room temperature fail to produce particles over a wide size range with less polydispersity. For example, gold nanoparticles have been prepared at room temperature using hydrazine or sodium borohydride, ascorbic acid, starch, gallic acid and chitosan. In aqueous phase synthesis, gold nanoparticles of size smaller than 3 nm are synthesized using hazardous, strong reducing agents like sodium borohydride and hydrazine. Many attempts have been made to synthesize gold nanoparticles through "green synthesis" approach using starch or glucose, chitosan and soybean, but they do not yield a wide size range of nanoparticles with low polydispersity.

SUMMARY OF THE INVENTION

In one aspect, the present application provides methods for preparing metal or metal oxide nanoparticles comprising contacting (i) an aqueous metal precursor solution comprising a first metal precursor with (ii) an aqueous hydrolysable gallotannin solution under conditions suitable to form a nanoparticle solution comprising metal or metal oxide nanoparticles having a mean diameter of less than about 40 nm, wherein the aqueous hydrolysable gallotannin solution has a pH of about 6-13; and the hydrolysable gallotannin or hydrolysable gallotannin hydrolysis products are the only reducing agents and the only stabilizers present in the aqueous metal precursor solution and the aqueous hydrolysable gallotannin solutions.

An illustrative embodiment includes but is not limited to a method for preparing metal or metal oxide nanoparticles by contacting (i) an aqueous metal precursor solution comprising a first metal precursor with (ii) an aqueous hydrolysable gallotannin solution under conditions suitable to form a nanoparticle solution comprising metal or metal oxide nanoparticles having a mean diameter of less than about 40 nm. The aqueous hydrolysable gallotannin solution includes but is not limited to a pH of about 6-13; and the hydrolysable gallotannin or hydrolysable gallotannin hydrolysis products are the reducing agents and the stabilizers present in the aqueous metal precursor solution and the aqueous hydrolysable gallotannin solutions.

According to another aspect of the embodiments, the contacting occurs at a temperature of about 10° C. to about 100° C.

According to another aspect of the embodiments, the metal or metal oxide nanoparticles includes but is not limited to a diameter polydispersity of less than about 15%.

According to another aspect of the embodiments, the contacting occurs at a temperature of about 10° C. to about 40° C.

According to another aspect of the embodiments, the aqueous metal precursor solution includes but is not limited to chloroauric acid and has a pH of about 0-5.

According to yet another aspect of the embodiments, the aqueous metal precursor solution includes but is not limited to a silver salt and has a pH of about 6.5-7.0.

According to another aspect of the embodiments, the metal or metal oxide nanoparticles includes gold, silver, copper, platinum, platinum oxide, zinc, zinc oxide, iron oxide, palladium, manganese, or lanthanide nanoparticles.

According to another aspect of the embodiments, the contacting includes but is not limited to adding the aqueous metal precursor solution to the aqueous hydrolysable gallotannin solution.

According to yet another aspect of the embodiments, the first aqueous metal precursor solution is added to the aqueous hydrolysable gallotannin solution at a rate of less than about 5.0 mL/min.

According to yet another aspect of the embodiments, the molar ratio of the hydrolysable gallotannin to the first metal precursor is about 0.01 to 20.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE INVENTION

Figure 1:
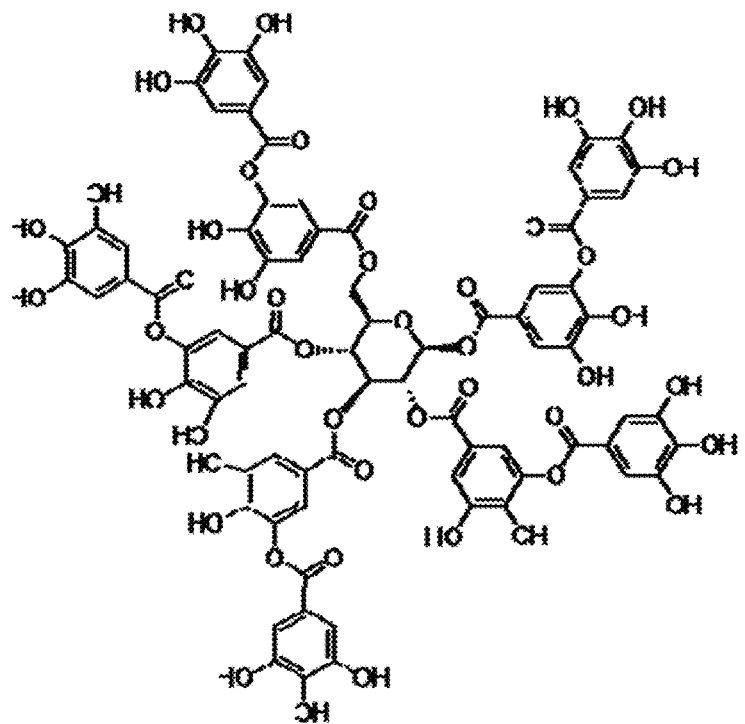
FIG. 1 is a representative chemical structure for tannic acid.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In accordance with the present disclosure, metal or metal oxide nanoparticles are prepared by contacting (i) an aqueous metal precursor solution comprising a first metal precursor with (ii) an aqueous hydrolysable gallotannin solution under conditions suitable to form a nanoparticle solution comprising metal or metal oxide nanoparticles having a mean diameter of less than about 40 nm, wherein the aqueous hydrolysable gallotannin solution has a pH of about 6-13; and the hydrolysable gallotannin or hydrolysable gallotannin hydrolysis products are the only reducing agents and the only stabilizers present in the aqueous metal precursor solution and the aqueous hydrolysable gallotannin solutions.

The contacting of the aqueous metal precursor solution and the aqueous hydrolysable gallotannin solution takes place under conditions suitable to form a nanoparticle solution comprising metal or metal oxide nanoparticles having a mean diameter of less than about 40 nm. The contacting generally occurs at a temperature of about 10° C. to about 100° C., or about 10° C. to about 40° C., or about 10° C. to about 30° C.

Each of the aqueous metal precursor solution and the aqueous hydrolysable gallotannin solution comprise at least water and may further comprise, for example polar solvents such as ethanol, methanol, N,N-dimethylformamide, dimethylsulfoxide, and the like. The term "aqueous solution" as used herein means a solution whose liquids components comprise water and one or more solvents which are miscible with water, such as, but not limited to, ethanol, methanol, N,N-dimethylformamide, dimethylsulfoxide, and the like. In certain embodiments, the aqueous solution comprises at least 90% water by volume.

The present methods can be used to prepare, for example gold, silver, copper, platinum, platinum oxide, zinc, zinc oxide, iron oxide, palladium, manganese, and/or lanthanide nanoparticles. The term "lanthanide" as used herein means one of the elements having atomic numbers 57 to 71, inclusive.

The term "metal precursor" as used herein means a chemical compound capable of being chemically reduced to form metal nanoparticles, for example, a metal salt. Suitable metal salts include halide (e.g., chloride or bromide), sulfate, or nitrate salts. In certain embodiments, each of the metal precursors are independently a gold salt, a silver salt, a copper salt, a platinum salt, a zinc salt, a iron salt, a palladium salt, a manganese salt, and/or a lanthanide salt. Examples of metal precursors include, but are not limited to, chloroauric acid, silver nitrate, copper sulfate, ferric chloride, hexachloroplatinate, palladium chloride, zinc nitrate, europium nitrate, and cobalt nitrate.

In certain embodiments, the first metal precursor comprises chloroauric acid and the metal nanoparticles comprise gold nanoparticles. In certain other embodiments, the first metal precursor comprises silver nitrate and the metal nanoparticles comprise silver nanoparticles. In yet other embodiments, the first metal precursor comprises copper sulfate and the metal nanoparticles comprise copper nanoparticles.

For the preparation of gold nanoparticles, the aqueous metal precursor solutions can comprise chloroauric acid and have a pH of about 0-5, and more specifically about 2-5. Further, for the preparation of silver nanoparticles, the aqueous metal precursor solutions can comprise a silver salt, such as silver nitrate, and have a pH of about 6.5-7.0.

The metal precursors can be present in the aqueous metal precursor solution at a concentration of less than about 10 mM, and more specifically in a range of about 0.1 to 10 mM or 0.1 to 5 mM, or 0.1 to 2 mM.

The term "aqueous hydrolysable gallotannin solution" as used herein means a solution comprising water and a hydrolysable gallotannin, as defined herein. The term "hydrolysable gallotannin" as used herein means a mixture of chemical compounds where the compounds comprise glucose bonded via an ester bond formed between a hydroxy group of the glucose and the carboxylic acid group of a phenolic carboxylic acid, where one or more of the five hydroxy groups of glucose are independently bonded via an ester bond to a phenolic carboxylic acid. Each of the phenolic carboxylic acids are independently selected from the group consisting of (i) compounds of the formula,

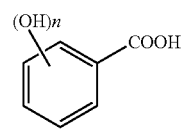

wherein n is 1, 2, 3, 4, or 5; and (ii) compounds of the formula,

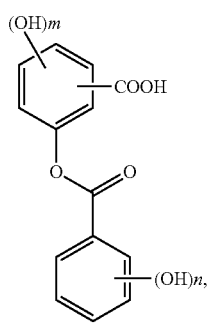

wherein n is 1, 2, 3, 4, or 5 and m is 1, 2, 3, or 4. Examples of phenolic carboxylic acids include but are not limited to, salicylic acid, m-hydroxybenzoic acid, p-hydroxybenzoic acid, gallic acid, m-digallic acid, and p-digallic acid. For example, hydrolysable gallotannins include but are not limited to, tannic acid.

The term "hydrolysable gallotannin hydrolysis products" as used herein means the glucose and the phenolic carboxylic acid constituents of a hydrolysable gallotannin which are generated upon acid or base catalyzed hydrolysis of the hydrolysable gallotannin.

The aqueous hydrolysable gallotannin solution comprising the hydrolysable gallotannin generally has a pH of about 6-13, and more specifically, about 7-11. In one embodiment, the aqueous hydrolysable gallotannin solution is freshly prepared and utilized in the present methods by dissolving the hydrolysable gallotannin in an aqueous solution and adjusting the pH of the aqueous hydrolysable gallotannin solution to be between about 6 and 13. The pH can be adjusted by adding a base to the aqueous hydrolysable gallotannin solution such as potassium carbonate. A solution is considered "freshly prepared" as used herein if the solution is used in the present methods within two days, and preferably within one day of its preparation; such freshly prepared solutions can be stored in the dark.

In certain embodiments, the hydrolysable gallotannin is tannic acid. When tannic acid is used, it may be derived from natural sources, such as plants, commercial sources, or synthetically prepared.

The hydrolysable gallotannin can be present in the aqueous hydrolysable gallotannin solution at a concentration less than about 10 mM, and more specifically in a range of about 0.1 to 10 mM or 0.1 to 5 mM, or 0.1 to 2 mM.

In a particular embodiment, the first metal precursor is present in the aqueous metal precursor solution at a concentration of less than about 10 mM and the hydrolysable gallotannin is present in the aqueous hydrolysable gallotannin solution at a concentration of less than about 10 mM.

The molar ratio of the hydrolysable gallotannin in the aqueous hydrolysable gallotannin solution to the first metal precursor in the aqueous metal precursor solution, can be used to tune the mean diameter of the metal nanoparticles which are produced. For example, the molar ratio of the hydrolysable gallotannin in the aqueous hydrolysable gallotannin solution to the first metal precursor in the aqueous metal precursor solution can be about 0.01 to 20. In one particular embodiment, the molar ratio of the hydrolysable gallotannin to first metal precursor can be selected from a range of about 0.5 to 3 to yield metal nanoparticles having a mean diameter of about 2-6 nm.

In certain embodiments for the preparation of silver nanoparticles, the molar ratio of the hydrolysable gallotannin to the first metal precursor can be selected to yield a desired mean diameter; for example, the molar ratio of the hydrolysable gallotannin to the first metal precursor can be selected from the range of about 0.05 to 1.0 to yield silver nanoparticles having a mean diameter of about 3 nm to about 40 nm.

In certain embodiments, metal or metal oxide nanoparticles having a mean diameter of about 2-10 nm can be added to the aqueous hydrolysable gallotannin solution (i.e., the aqueous hydrolysable gallotannin solution can be seeded with metal or metal oxide nanoparticles) for the preparation of metal or metal oxide nanoparticles having mean diameters of about 10-40 nm and diameter polydispersity of less than 15%.

In certain embodiments, the metal or metal oxide nanoparticles added to the aqueous hydrolysable gallotannin solution can comprise the same metal as first metal precursor (or same metals when the aqueous metal precursor solution comprises two or more metal precursors, as discussed below).

The contacting of the aqueous metal precursor solution with the aqueous hydrolysable gallotannin solution can comprise, for example, adding the aqueous metal precursor solution to the aqueous hydrolysable gallotannin solution. In certain embodiments, the aqueous metal precursor solution is added to the aqueous hydrolysable gallotannin solution at a rate of less than about 5.0 mL/min, such as, for example about 0.1 to about 5.0 mL/min, or about 0.5-5.0 mL/min, or about 1.0-5.0 mL/min. As used herein, a solution is added "slowly" when it is added at a rate of less than about 5.0 mL/min. For example, when a 0.1 to 10 mM reagent solution is slowly added at a rate of about 1-5 mL/min, then the reagent is added at a rate of about 0.001 mmol/min to about 0.05 mmol/min, that is, less than 0.05 mmol/min. In certain other embodiments, the aqueous metal precursor solution is added at once to the aqueous hydrolysable gallotannin solution.

In a particular embodiment, for the preparation of gold nanoparticles, the aqueous metal precursor solution is added to the aqueous hydrolysable gallotannin solution at a rate of less than about 5.0 mL/min. In a particular embodiment, for the preparation of silver nanoparticles, the aqueous metal precursor solution is added to the aqueous hydrolysable gallotannin solution at a rate of less than about 5.0 mL/min.

Alternatively, in certain other embodiments, the aqueous hydrolysable gallotannin solution can be added at once to the aqueous metal precursor solution. In a particular embodiment, for the preparation of silver nanoparticles, the aqueous metal precursor solution can be added to the aqueous hydrolysable gallotannin solution at once or the aqueous hydrolysable gallotannin solution can be added to the aqueous metal precursor solution at once.

The nanoparticles produced by the present methods can comprise metal alloys, for example, by using an aqueous metal precursor solution comprising two or more metal precursors (e.g., first and second metal precursors where each of the metal precursors comprises a different metal). The alloy nanoparticles comprise an alloy of the metals of the first and second metal precursors where the metal content of the alloy can be controlled by the relative molar ratio of the metals in the first and second metal precursors. For example, an aqueous metal precursor solution comprising a 1:1 molar ratio of a gold salt to a silver salt, based on the concentration of the gold and silver ions, respectively, can yield AuAg alloy nanoparticles. In another example, an aqueous metal precursor solution comprising a 1:1 molar ratio of an iron salt to a platinum salt, based on the concentration of the iron and platinum ions in the aqueous metal precursor solution, can yield FePt alloy nanoparticles.

Alternatively, alloy nanoparticles can be prepared by contacting first and second metal precursor solutions comprising first and second metal precursors, respectively, with an aqueous hydrolysable gallotannin solution. The first and second metal precursor solutions can be added separately and simultaneously to the aqueous hydrolysable gallotannin solution. The rates of addition of the first and second metal precursor solutions can be adjusted as necessary taking into account the different reduction rates of the metal precursors, subject to the rates of addition noted above.

The term "alloy nanoparticle" as used herein means a nanoparticle comprising an alloy of the noted constituent atoms; such nanoparticles are referred to herein by the empirical formula of the constituent components. Alloy nanoparticles can be prepared, for example, of the formula $A_xB_{1-x}$, wherein A and B are the metals from the first and second metal precursors, and x is between 0 and 1. In a particular example, AuAg alloy nanoparticles (i.e., $Au_{0.5}Ag_{0.5}$) can be prepared comprising Au and Ag atoms in a 1:1 ratio. In another example, $Au_{0.33}Ag_{0.67}$ alloy nanoparticles can be prepared comprising Au and Ag atoms in a 1:2 ratio. In yet another example, FePt alloy nanoparticles (i.e., $Fe_{0.5}Pt_{0.5}$) can be prepared comprising Fe and Pt atoms in a 1:1 ratio.

Further, core-shell nanoparticles can be produced by the present methods by using two or more aqueous metal precursor solutions. For example, core-shell nanoparticles can be produced by contacting a first aqueous metal precursor solution comprising a first metal precursor with an aqueous hydrolysable gallotannin solution to form a second solution comprising metal or metal oxide nanoparticles; and contacting the second solution with a second metal precursor solution comprising a second metal precursor. In such methods, the second solution comprises the "core" nanoparticles comprising a metal or metal oxide of the metal in the first metal precursor and the "shell" is provided comprising a metal or metal oxide of the metal in the second metal precursor. In such methods, the metal content of the first and second metal precursors are generally different, although, core-shell nanoparticles can be generated comprising a metal core with a shell of a metal oxide of the same metal; for example, core-shell nanoparticles can be generated comprising an iron core and an iron oxide shell.

The term "core-shell nanoparticle" as used herein means a nanoparticle comprising a core of a first metal or metal oxide surrounded by a shell of a second metal or metal oxide. Such core-shell nanoparticles are referred to herein by a convention where the constituent elements of the core and the shell, respectively are separated by a dash "—", For example, core-shell nanoparticles can be prepared comprising a silver core and a gold shell and are noted "Ag—Au" nanoparticles. In another example core-shell nanoparticles can be prepared comprising a gold core and a silver shell and are noted "Au—Ag" nanoparticles. In another example core-shell nanoparticles can be prepared comprising a gold or platinum core and a platinum or gold shell, and are noted "Au—Pt" and "Pt—Au" nanoparticles, respectively. In another example core-shell nanoparticles can be prepared comprising a palladium or platinum core and a platinum or palladium shell and are noted "Pd—Pt" and "Pt—Pd" nanoparticles respectively.

In certain other embodiments, the nanoparticles added to the aqueous hydrolysable gallotannin solution, as discussed above, can comprise a different metal from the metal of the first metal precursor for the preparation of core-shell nanoparticles. Alternatively, the nanoparticles comprise at least one different metal when the aqueous metal precursor solution comprises two or more metal precursors or when the metal or metal oxide nanoparticles added to the aqueous hydrolysable gallotannin solution are alloy nanoparticles. In such methods, the core of the core-shell particles are provided by the nanoparticles added to the aqueous hydrolysable gallotannin solution and the shell is provided by the aqueous metal precursor solution.

For the preparation of alloy or core-shell nanoparticles, the molar ratio of the hydrolysable gallotannin in the aqueous hydrolysable gallotannin solution to the metal content of the first and second metal precursors present in either the single aqueous metal precursor solution or the first and second metal precursor solutions as well as the concentration of the first and second metal precursors can be used to tune the mean diameter of the alloy or core-shell nanoparticles as described above.

In certain embodiments, the nanoparticles generated according to any of the preceding methods have a mean diameter of about 1-40 nm or about 2-25 nm, or about 2-15 nm, or about 2-20 nm, or about 2-6 nm. Further, in certain embodiments, the nanoparticles generated have a diameter polydispersity of less than about 15%, such as 5-15% or 8-12%.

In a particular embodiment, when the nanoparticles are gold nanoparticles, then the gold nanoparticles have a mean diameter of about 1-40 nm and a diameter polydispersity of less than about 15%. In another particular embodiment, when the nanoparticles are silver nanoparticles, then the silver nanoparticles have a mean diameter of about 1-40 nm and a diameter polydispersity of less than about 15%.

The term "mean diameter" as used herein refers to the mean diameter as measured via transmission electron microscopy (TEM) according to methods known to one skilled in the art. The term "diameter polydispersity" as used herein is defined by, $(SD/Mean)*100$, where "SD" is the standard deviation of the metal nanoparticle diameters and "Mean" is the mean diameter of the metal nanoparticles, as defined herein. When referring to core-shell nanoparticles (infra), the mean diameter of the nanoparticle includes the shell.

Further, the nanoparticles resulting from any of the preceding methods can have a surface coating comprising the hydrolysable gallotannin, hydrolysis products of the hydrolysable gallotannin, or mixtures thereof. The hydrolysis products of the hydrolysable gallotannin are generally glucose and polyphenolic carboxylic acids, as defined herein. For example, hydrolysis of tannic acid generally yields glucose, gallic acid, and/or digallic acid. In a subsequent step, the nanoparticles can be exposed to conditions suitable to remove a surface coating from the metal nanoparticles. Such conditions include, but are not limited to, changing the pH of the colloid or boiling the nanoparticles with hydrogen peroxide.

Once any surface coatings which may be present have been removed, the nanoparticles may be contacted with a solution of compounds capable of forming a coating on the surface of the nanoparticles. For example, gold nanoparticles or core-shell nanoparticles having a gold shell can be contacted with a third solution comprising a biomolecule or an alkylthiol. An "alkylthiol" as used herein means a straight or branched hydrocarbon chain containing 1-30 carbon atoms and substituted with at least one thiol group.

The present methods are amenable to large-scale preparation such that the combined volume of the aqueous metal precursor solution (or first and second metal precursor solutions) and the aqueous hydrolysable gallotannin solution can be up to 100 L.

In a second aspect, the present application provide methods for preparing metal nanoparticles comprising contacting (i) a first aqueous solution comprising a first metal precursor with (ii) a second aqueous solution comprising glucose and a polyhydroxybenzoic acid, under conditions suitable to form metal nanoparticles having a mean diameter of less than about 40 nm, wherein the second aqueous solution has a pH of about 6-13.

EXAMPLES

Example 1

Preparation of Gold Nanoparticles with Tannic Acid

Hydrogen tetrachloroaurate (III) hydrate and tannic acid were purchased from Acros Organics (Geel, Belgium). Potassium carbonate and dichloromethane were purchased from Merck. 1-Dodecylmercaptan was purchased from Sigma-Aldrich (Milwaukee, Wis.). D-Glucose, anhydrous was purchased from Himedia (Mumbai, India). 3,4,5-trihydroxybenzoic acid monohydrate (gallic acid), hydrogen peroxide, n-hexane, and hydrochloric acid were purchased from S. D. fine-chem Ltd. (Mumbai, India). Deionized water obtained from MilliQ® (Millipore, Billerica, Mass.) was used in experiments. All chemicals were used as received.

The experiments were carried out in glassware cleaned with aqua regia (1:3 volumetric ratio of nitric acid to hydrochloric acid), rinsed with tap water followed by deionized (DI) water and then dried prior to use.

pH Studies

The precursor solutions were prepared as follows: 0.25 mL of 25.4 mM chloroauric acid was made up to 22 mL using DI water. 2.25 mL of 5.9 mM tannic acid was made up to 3 mL using DI water. 150 mM potassium carbonate solution was used to adjust the pH of tannic acid and chloroauric acid solution. As applicable, 0.1 N hydrochloric acid was used to adjust the pH of chloroauric solution.

A home built reactor consisting of a rushton turbine and baffles made of Teflon was used to mix the reactants. Chloroauric solution was taken in the stirred vessel and the reducing agent was added instantaneously, within 1 second. The reaction mixture was stirred until the saturation of the color of colloid was observed.

Stop Flow Reactor Studies

Stock solutions of chloroauric acid and tannic acid were prepared as follows: 0.25 mL of 25.4 mM chloroauric acid was made up to 20 mL using DI water. 2.25 mL of 5.9 mM tannic acid and 0.5 mL of 150 mM potassium carbonate were made up to 5 mL using DI water. A stop flow reactor (SFR) was used to study the absorbance of the reaction mixture after rapid mixing (within 1 ms) of reactants. Chloroauric acid and tannic acid were mixed in a ratio of 4:1 volumetric ratio.

Studies on Effect of Mode of Mixing

For the instantaneous addition of chloroauric acid, 3 mL of 2.12 mM chloroauric acid was added to a reducing mixture containing 21.5 mL of 0.60 mM tannic acid and 0.5 mL of 150 mM potassium carbonate and the combined solution mixed for 15 min.

The chloroauric acid slow addition experiments were performed by adding 10 mL of 0.64 mM chloroauric acid into a reducing mixture containing 14.5 mL of 0.89 mM tannic acid and 0.5 mL of 150 mM potassium carbonate at rate of 1 mL/min. After completion of the addition, the mixture was mixed for 5 min.

The tannic acid slow addition experiments were conducted by adding a reducing mixture containing 9.5 mL of 1.33 mM tannic acid and 0.5 mL of 75 mM potassium carbonate into 15 mL of 0.42 mM chloroauric acid at rate of 1 ml/min.

Characterization of Nanoparticles

Gold nanoparticles were characterized by dynamic light scattering (DLS) performed at 90° at room temperature using Brookhaven BI 200SM (Brookhaven Instruments Corporation, Holtzville, N.Y.). Non-negative constraint Least Square software, supplied by Brookhaven, was used to calculate the intensity weighed nanoparticle size. Six 2-minute runs were averaged to obtain the mean diameter and standard deviation of the nanoparticles.

Transmission electron microscopy (TEM) characterization was performed using Tecnai 300 (FEI Company, Hillsboro, Oreg.) at 200 KV. ImageJ™ was used for processing the TEM images. At least 500 particles were used to obtain the mean and standard deviations for the nanoparticle distributions via a Gaussian fit.

Example 2

Effect of the pH of System for Gold Nanoparticles

To understand the role of pH in the synthesis of gold nanoparticles by tannic acid reduction, a systematic study was performed by varying the pH of reagents. In all experiments, the molar ratio of tannic acid to chloroauric acid was 2.08.

(a) Effect of Reducing Mixture pH

A set of experiments was performed by varying the pH of the tannic acid reducing mixture while the pH of chloroauric solution remained at a value of 3.2. The pH of the tannic acid was varied from 3.1 to 9.5 by adding required amount of potassium carbonate. After addition of a pH 3.1 reducing mixture, the combined reaction mixture was colorless for 3 s while at pH≧7 the appearance of color in the reaction mixture was instantaneous.

Figure 2A:
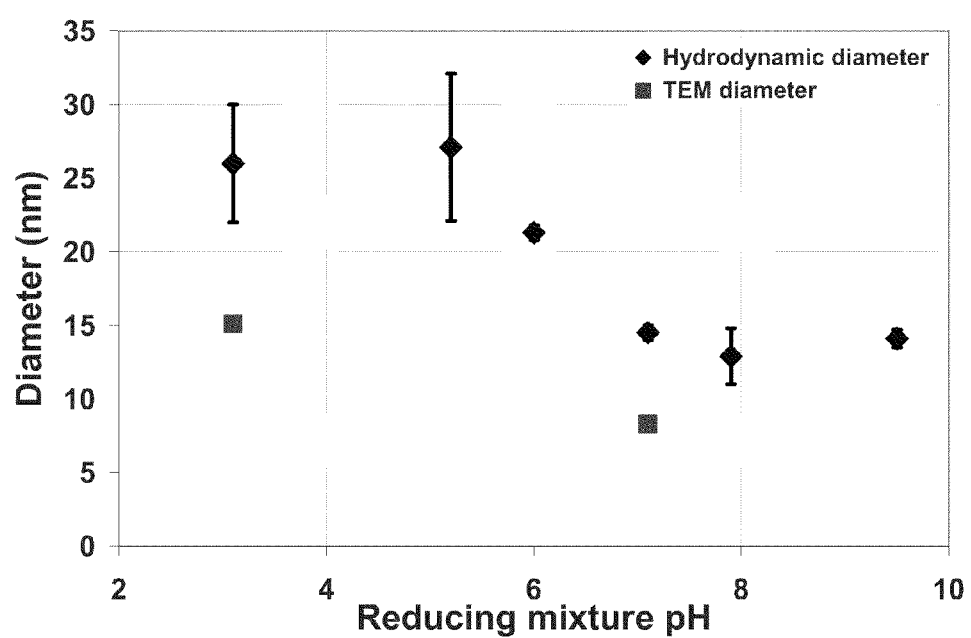
FIG. 2a is a graph showing variation of hydrodynamic diameter with reducing mixture pH. The standard deviation of six readings in dynamic light scattering is shown in plot.
Figure 2B:
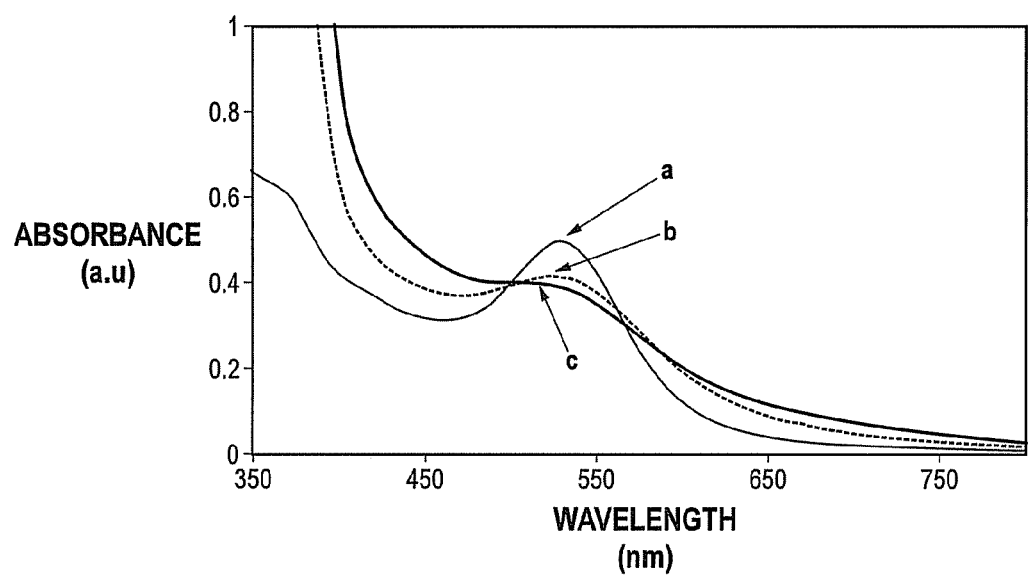
FIG. 2b is a graph showing a UV visible spectrum of gold colloids prepared with different pH of reducing mixture.

As the pH of reducing mixture was increased from 3.1 to 9.5, the hydrodynamic diameter of the nanoparticle decreased from 26 nm to 14 nm. The variation of hydrodynamic size with the pH of reducing mixture is shown in FIG. 2a.

Figure 2C:
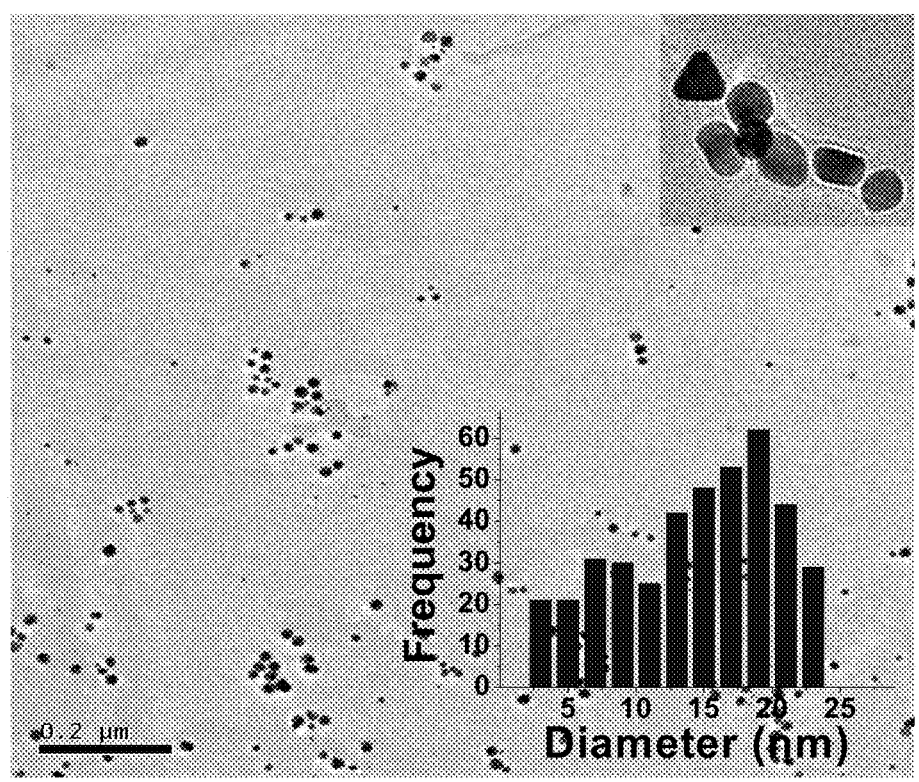
FIG. 2c is an example transmission electron microscopy (TEM) image of nanoparticles synthesized with reducing mixture at pH 3.1. Scale bar=200 nm. Inset image shows the shape of nanoparticles. Diameter=15.4±5.5 nm.

The TEM image of nanoparticles synthesized with a reducing mixture at pH 3.1 is shown in FIG. 2c. An inset image shows the shape of nanoparticles, and a bar graph shows the nanoparticle diameter distributions after a Gaussian fit. With the image scale bar set at 200 nm, the diameter of nanoparticles as determined from the TEM image was 15.4±5.5 nm. Through a different TEM image, the diameter of particles synthesized with a reducing agent at pH 7.1 was accordingly determined to be 9.1±1.9 nm.

The hydrodynamic diameter obtained from DLS was always greater than TEM mean diameter. This difference in the diameter can be due to the presence of stabilizing agent on the particle surface which alters the hydrodynamic diameter but is generally invisible in TEM images. The decrease in the nanoparticle size with increase in the pH of the reducing agent was not linear and the decrease in the size was negligible after pH 7.

The nanoparticles prepared with reducing mixture at pH 3.1 were faceted and a few rod-like particles were also seen.

(b) Effect of Chloroauric Acid pH

An experiment was performed with both precursors above pH 7 to determine the effect of the pH of the chloroauric acid solution on the synthesis protocol.

According to the methods of Example 1, a pH 9.1 chloroauric acid solution was added to a pH 7.1 tannic acid solution. The reaction mixture remained colorless for 5 minutes and then gradually turned pink. The final reaction mixture pH was 7.4. The hydrodynamic diameter of the nanoparticle synthesized was 20.6 nm. The TEM mean diameter of nanoparticles was 12.9±4.7 nm.

In contrast, in a reaction performed with a pH 7.9 tannic acid solution and a pH 3.2 chloroauric acid solution resulted in final reaction mixture with pH 7.1, and yielded nanoparticles having a hydrodynamic diameter of 14.5±0.5 nm and a TEM diameter of 9.1±1.9 nm (c) Effect of Initial pH of Reactant Further controlled experiments were carried out to understand the role of the reactant pH on the synthesis protocol. A constant amount of $3.6 \times 10^{-5}$ gmoles of potassium carbonate was divided between the chloroauric acid solution and the reducing mixture such that the pH of final solution was the same in all cases.

The reaction condition and results are tabulated in Table 1. The experiments shown in Table 1 were performed in a stop flow reactor to analyze and compare the time scales. After mixing the reactants, the absorbance of colloids at 530 nm was monitored with respect to time.

The reaction condition and results are tabulated in Table 1.

TABLE 1

Effect of reactant pH on nanoparticle size at same final pH of reaction mixture

| Case | $K_2CO_3$ in chloroauric acid ($10^{-5}$ gmoles) | pH of chloroauric acid | $K_2CO_3$ in reducing mixture ($10^{-5}$ gmoles) | pH of reducing agent | Hydrodynamic mean diameter ± SD (nm) | TEM mean diameter ± SD (nm) | Final pH |
|---|---|---|---|---|---|---|---|
| a | 0 | 3.2 | 3.6 | 7.1 | 14.5 ± 0.5 | 9.1 ± 1.9 | 6.4 |
| b | 1.8 | 7 | 1.8 | 6.3 | 18 ± 1.2 | 10.9 ± 4.3 | 6.4 |
| c | 3.6 | 9.1 | 0 | 3.1 | 23.2 ± 1.5 | 17.5 ± 5.9 | 6.4 |

The reaction performed with chloroauric acid at pH 3.1 and tannic acid at pH 7.1 resulted in nanoparticles of hydrodynamic diameter of 14.5 nm and the appearance of a red color was instantaneous. When the tannic acid at pH 3.2 was mixed into chloroauric acid at pH 9.1, the reaction mixture remained colorless for 7 minutes and then gradually turned red. The hydrodynamic diameter of the nanoparticles synthesized was 23.2±1.5 nm and the diameter measured by TEM was 17.5±5.9 nm. These experiments indicate that the size of the nanoparticles synthesized was dependent on the initial pH of reactants.

Figure 3:
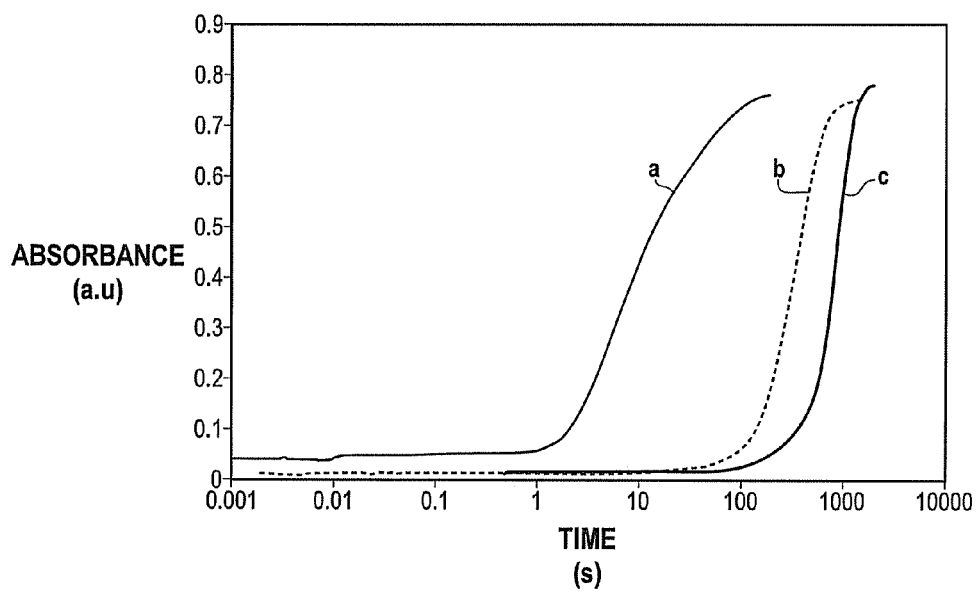
FIG. 3 a graph showing the changes in absorbance at 530 nm, attributed to plasmon resonance of gold nanoparticles synthesized at different initial pH conditions; line (a) chloroauric acid at pH 3.2, tannic acid at pH 6.3; line (b) chloroauric acid at pH 7.0, tannic acid at pH 6.4; line (c) chloroauric acid at pH 9.1, tannic acid at pH 3.1.

FIG. 3 shows the absorbance of colloids with respect to time. The experiments conducted with different initial pH of reactant show that the reaction was faster when the pH of chloroauric acid is 3.1 and that of tannic is 7.1. Under these conditions, the time period of induction obtained from the SFR measurement is 1 s and the time required for completion of the synthesis is 120 s. The induction period for the experiment performed with chloroauric acid at pH 9.1 and tannic acid at pH 3.1 is 100 s and the time taken for completion is 120 s.

The observed induction period is also a measure of rate of reaction. In the former case, a relatively fast reaction yielded smaller nanoparticles, while in the latter case a relatively slow reaction yielded larger nanoparticles.

Example 3

Role of Reagent Reactivity

To understand the parameters controlling the nanoparticle size in the synthesis, the mechanisms involved in the nanoparticle formation and the reactivity of the reagents at different pH was analyzed.

As the reduction of chloroauric acid by tannic acid proceeds the concentration of gold atoms increases and reaches supersaturation. The supersaturated solution can nucleate and the nuclei can grow into nanoparticles. The degree of supersaturation controls the number of nuclei formed. For a given amount of gold precursor, a faster reaction generates a higher supersaturation, producing a greater number of nuclei, and yielding smaller nanoparticles. A slow reaction results in lower degree of supersaturation, giving rise to fewer nuclei, and larger nanoparticles. Alternatively, in the absence of a stabilizer, nuclei and nanoparticles produced may coagulate to yield larger nanoparticles. Thereby, the kinetics of the reaction and the availability of stabilizer can control the nanoparticle size.

Tannic acid is a weak acid and the dissociation of acidic hydroxyl group is pH dependent. The dissociation factor becomes unity at pH 8. The dissociated hydroxyl group of tannic acid is highly reactive and hence the rate of reaction can depend on the concentration of dissociated tannic acid. If the rate of dissociation is greater than the rate of reaction, the concentration of dissociated tannic acid can remain consistent throughout the reaction.

The first set of experiments was performed with various reducing agent pH values. At a lower pH, the concentration of the dissociated tannic acid is lower and results in a slower reaction; while at a higher pH, the concentration of dissociated tannic acid is higher and results in a faster reaction. The observed time for appearance of color (an indicator of reaction rate) and the nanoparticle size is in accord with this reasoning, that is, the obtained hydrodynamic diameter increased with reducing mixture pH, indicating an inverse correlation, The preceding description holds when the reactivity of chloroauric acid remains same at all pH. The other precursor used in the reaction, chloroauric acid, also has pH dependent reactivity. The chlorine ions in the $AuCl_4^-$ precursors can be replaced by hydroxide ions at higher pH. The hydroxide substituted precursor, $Au(OH)_4^-$, has less reactivity when compared to that of chloride precursors. When the experiment was performed with chloroauric acid at pH 9.1, the gold precursor was in a less reactive hydroxide form, $Au(OH)_4^-$. In this case, the reaction mixture remained colorless for 5 minutes, indicating a slower reaction and yielded larger nanoparticles.

Experiments summarized in Table 1 were performed at the same reaction mixture pH but with different initial reactant pH and resulted in nanoparticles of different diameters. Since the chemical composition after mixing is the same in all cases shown in Table 1, one might expect the nanoparticle sizes to be similar.

To explain the variation it helps to determine the rate of change of precursor forms with the change in pH. Upon mixing the reagents, their respective pH environments change to the pH of the combined reaction mixture, triggering a change in the reagent forms. Protonation/deprotonation of tannic acid is diffusion limited, but the changes in chloroauric acid take place through a relatively slow ligand transfer mechanism which can be tracked spectroscopically.

Figure 4A:
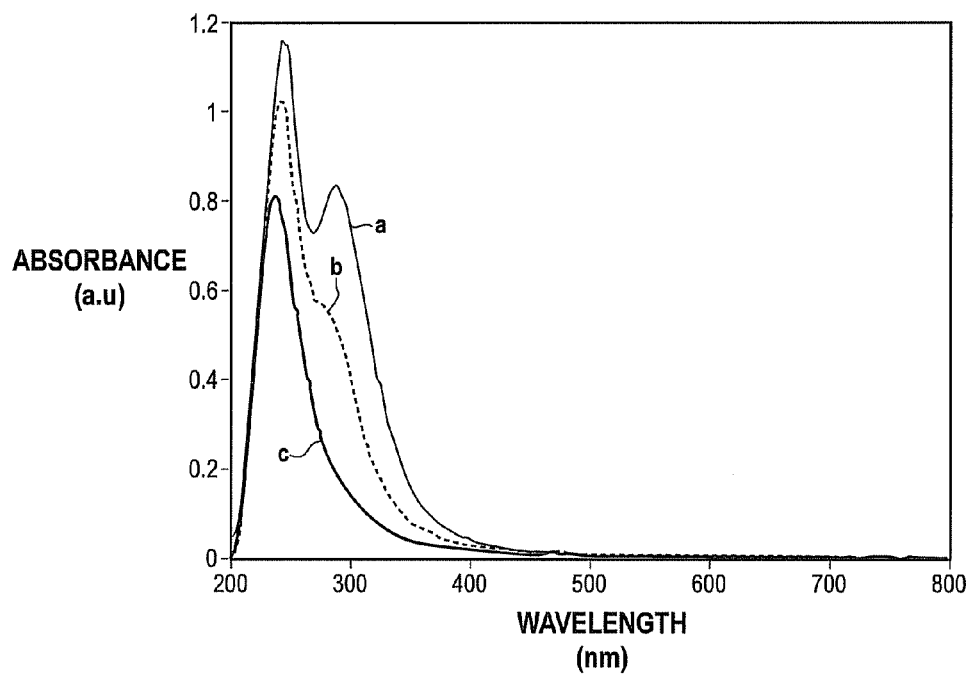
FIG. 4a is a UV visible spectrum of chloroauric solution at different pH; line a, pH 3.2; line b, pH 9.1 with 3 minutes aging; line c, pH 9.1 with 10 minutes aging.
Figure 4B:
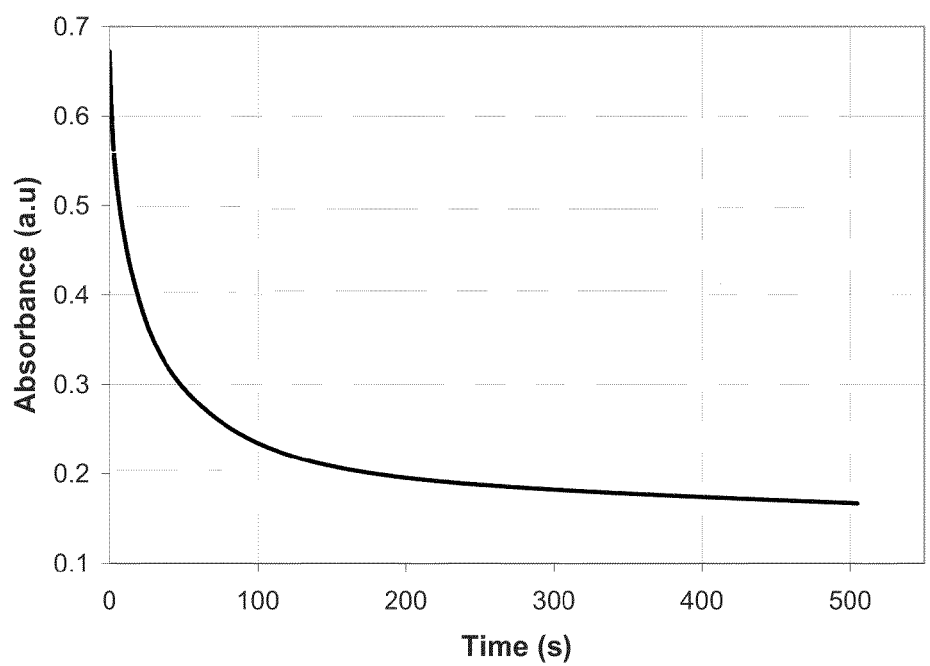
FIG. 4b is a graph showing the kinetics of absorbance at 290 nm after mixing with K₂CO₃ solution to change pH.

The UV visible spectrum of chloroauric acid at pH 3.2 and at pH 9.1 is shown in FIG. 4a. The chloroauric acid at pH 3.2 has a distinct peak at 290 nm in UV visible spectrum while for chloroauric acid at pH 9.1 the peak at 290 nm is absent. The spectrum also showed that the time taken for the disappearance of peak at 290 nm is on the order of minutes. The stop flow reactor was used to determine the kinetics of ligand exchange of chloroauric acid after changing the pH from 3.2 to 7. The absorbance at 290 nm was monitored after mixing chloroauric acid with potassium carbonate solution. FIG. 4b shows the change in the absorbance with respect to time. The time taken for the change in the absorbance to occur is of the order of 200 s.

Returning to Table 1, in case (a), chloroauric acid was initially at pH 3.2 and exists in a more active form. After mixing with the tannic acid solution, the pH increases to 6. However, chloroauric acid ligand exchange is only complete after 200 s and the SFR observation (FIG. 3) indicates that the reaction timescale is faster than the ligand exchange time scale. Hence, the more active form of chloroauric acid, $AuCl_4^-$, participates in the reaction, resulting in a faster reaction and smaller nanoparticles. In case (c) of Table 1, the initial pH of the reactant was 9.1, which decreased to pH 6 after mixing. During the preparation, an aging time of 15 min was provided to chloroauric acid at pH 9.1, which allowed for ligand exchange and generated the less active form of chloroauric acid. Due to the decreased activity of the gold precursor, the reaction was slower and resulted in larger particles. Thus, pH dependent structural form and reactivity may explain the importance of the initial pH of the reactant.

Example 4

Effect of Reaction Mixture pH

Figure 5:
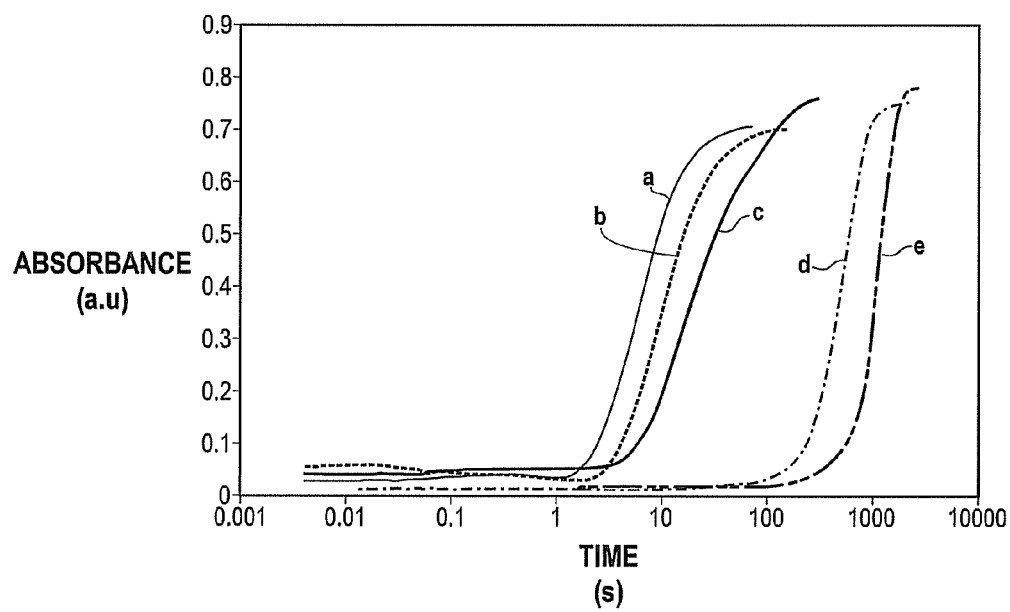
FIG. 5 is a graph showing the kinetics of absorbance at 530 nm at different pH conditions obtained using stop flow reactor; line (a) chloroauric acid at pH 2.1, tannic acid at pH 9.0, nanoparticles mean diameter 6.7 nm; line (b) chloroauric acid at pH 2.1, tannic acid at pH 7.1, nanoparticles mean diameter 9.7 nm; line (c) chloroauric acid at pH 3.2, tannic acid at pH 7.1, nanoparticles mean diameter 9.1 nm; line (d) chloroauric acid at pH 7.0, tannic acid at pH 6.3, nanoparticles mean diameter 10.9 nm; line (e) chloroauric acid at pH 9.1, tannic acid at pH 3.1, nanoparticles mean diameter 17.5 nm.

Further experiments, shown in Table 2, were performed to analyze the role of reaction mixture pH in the synthesis of nanoparticles. The molar ratio of tannic acid to chloroauric acid was 2.08. Both of these experiments with chloroauric acid at pH 2.1 were performed in a stop flow reactor to analyze and compare the reaction time scales. FIG. 5 shows the absorbance of the gold colloid at 530 nm with respect to time.

TABLE 2

Effect of reaction mixture pH when both precursors are at active form

| Case | pH of chloroauric acid | pH of tannic acid | Hydrodynamic diameter (nm) | TEM mean diameter (nm) | Final reaction mixture pH | Time for appearance of color |
|---|---|---|---|---|---|---|
| a | 2.1 | 7.1 | 18.6 | 9.7 ± 3.4 | 5 | Instantaneous |
| b | 2.1 | 9 | 13 | 6.7 ± 1.6 | 7.1 | Instantaneous |

In case (a) of Table 2, an experiment performed with chloroauric acid at pH 2.1 and tannic acid at pH 7.1, the final reaction mixture was pH 5. In these experiments, both of the precursors were in the more active states. For example, chloroauric acid should be more active at pH 2.1 than at pH 3.2 (i.e., Table 1, case a) and should generate nanoparticles with diameters less than the 14 nm hydrodynamic diameter of case (a) of Table 1. However, unexpectedly, the hydrodynamic diameter of the nanoparticles obtained was larger, 18.6 nm. The diameter of the nanoparticles obtained from TEM images was 9.7±3.4 nm. SFR (line b, FIG. 5) indicated that the reaction, with a final reaction mixture pH of 5, was relatively fast with an induction period of 0.6 s. The synthesis was complete at 90 s as indicated by the saturation of absorbance.

In case (b) of Table 2, the experiment was performed with tannic acid at pH 9, keeping the chloroauric acid at pH 2.1, such that the final reaction mixture pH was 7. In this case, the hydrodynamic diameter of the nanoparticles obtained was 13 nm and the diameter of the nanoparticles obtained from TEM images was 6.7±1.6 nm. SFR (line a, FIG. 5) indicated that, with a final reaction mixture pH 7, the reaction is also relatively fast yet resulted in smaller nanoparticles (6.7 nm).

For comparison, case (a) of Table 1 (chloroauric acid at pH 3.2, tannic acid at pH 7.1), is shown as line c of FIG. 5. Such conditions resulted in a relatively fast reaction rate as indicated by an induction time period of 1 s, and generated relatively small nanoparticles with a 9.1±1.9 nm diameter. The synthesis was complete at 120 s.

For all other experiments performed in SFR, as shown in FIG. 5 (lines d & e), the larger nanoparticles were result of slower reactions. Lines d and e correspond to cases b and c of Table 1, respectively.

In contrast, in case (a) of Table 2, a relatively fast reaction resulted in larger nanoparticles. One explanation would be that the larger nanoparticles were the result of coagulation of the nanoparticles. These experiments indicate that when the reaction mixture pH is less than 6, coagulation of particles may result in larger nanoparticles.

Based on the results obtained so far in terms of nanoparticle diameter and induction time period, the following mechanism is proposed. The rate of formation of gold atoms increases as pH of chloroauric acid is reduced and the pH of tannic acid is increased. So, for a constant amount of gold precursor in solution, an increased rate leads to rapid nucleation and smaller nanoparticles as long as the solution pH>6. However, if the final pH is less than 6 then coagulation of nanoparticles can occur leading to higher than the expected mean size.

Tannic acid, as shown in FIG. 1, does not have any exposed —COOH groups, and as a complete molecule may not stabilize nanoparticles. However, tannic acid, also known as a gallotannin, and in particular a hydrolysable gallotannin. Tannic acid hydrolyses into glucose and gallic acid in the presence of a base Without being bound by any one particular theory of operation, glucose, instead of gallic acid may be the stabilizer when tannic acid is used at high pH. It has been reported that gallic acid cannot stabilize particles smaller than 30 nm whereas glucose has been used to stabilize particles less than 10 nm.

In the present tannic acid reduction methods, it appears that the glucose obtained from the hydrolysis of tannic acid can stabilize the nanoparticles. The reaction mixtures with higher pH have higher concentration of OH ions and hence hydrolyze tannic acid. In agreement with our results, reaction mixtures with a higher pH have a higher concentration of glucose than a reaction mixture with low pH. Glucose can also reduce chloroauric acid but the rate of reaction at room temperature is negligible in comparison with rates reported here.

Example 5

Preparation of Gold Nanoparticles with Glucose and Gallic Acid

To validate the hypothesis of tannic acid hydrolysis and the role of glucose in stabilization, the following experiments were performed. A mixture of gallic acid and glucose, which is equivalent to complete dissociation of tannic acid at molar ratio 2.08, was prepared and the pH was adjusted to 7. This reducing mixture was mixed with chloroauric acid at pH 4.

In particular, the synthesis of gold nanoparticles using gallic acid/glucose as reducing/stabilizing agent was carried out in a manner similar to Example 1. The reducing mixture consisting of 2.40 mL of 55 mM gallic acid and 0.24 mL of 55 mM D-glucose was changed to pH 7 using 150 mM potassium carbonate. The volume of reducing mixture was made up to 3 mL using DI water.

The hydrodynamic diameter of the nanoparticle synthesized was 16 nm. The diameter of the nanoparticles obtained from the TEM image was 13.9±5.4 nm. This experiment shows that a mixture of gallic acid and glucose gives nanoparticles with average size similar to that synthesized by equivalent amount of tannic acid.

The same experiment was repeated in the absence of glucose to understand the importance of glucose in the stabilization of nanoparticles. Absence of glucose resulted in aggregated nanoparticles with a hydrodynamic size of 25 nm, indicating that glucose may play a role in stabilizing nanoparticles.

Example 6

Analysis of Polydispersity

The polydispersity of the nanoparticles obtained is summarized in Table 3. For all slower reactions the polydispersity was higher. The higher polydispersity may be due to the overlap of the nucleation and growth regime in conjunction with poor stabilization. To obtain monodisperse particles, the nucleation regime and growth regime should be separated. This can be achieved in a faster reaction where the particles do not coagulate.

The faster reactions in the Table 3 show both relatively high and low polydispersity. It is evident that the lower polydispersities are obtained when the pH of reaction mixture is greater than or equal to 6. When the pH of reaction mixture is below 6, due to the unavailability of stabilizer, the nanoparticles can coagulate resulting in a higher polydispersity.

TABLE 3

The diameter and polydispersity of nanoparticles obtained at different conditions

| pH | | | Mean Diameter | | | |
|---|---|---|---|---|---|---|
| Chloroauric acid | Tannic acid | Final reaction mixture | TEM (nm) | SD (nm) | Polydispersity % | Remarks |
| 3.2 | 3.1 | 3.2 | 15.4 | 5.5 | 35.7 | Fast reaction |
| 3.2 | 7.1 | 6.4 | 9.1 | 1.9 | 20.9 | Fast reaction |
| 9.1 | 7.1 | 7.5 | 12.9 | 4.7 | 36.4 | Slow reaction |
| 7.1 | 6.4 | 6.4 | 10.9 | 4.3 | 39.4 | Slow reaction |
| 9.1 | 3.1 | 6.4 | 17.5 | 5.9 | 33.7 | Slow reaction |
| 2.1 | 7.1 | 5 | 9.7 | 3.4 | 35.1 | Fast reaction |
| 2.1 | 9 | 7.1 | 6.7 | 1.6 | 23.9 | Fast reaction |

Example 7

Effect of Mode of Mixing Reactants

The experimental results so far have demonstrated the ability to control the mean size of nanoparticles over a wide diameter range using a simple protocol. However, the highly polydisperse and irregularly shaped nature of the nanoparticles indicates that coalescence is playing a role. Considering the time scale needed for the stabilizer to diffuse up to the mixing interface and to adsorb onto the freshly formed nuclei in comparison to the very rapid nucleation kinetics (in order of ms), it was hypothesized that coalescence could be reduced if the nuclei were generated in a solution containing an excess of stabilizer.

In all experiments discussed so far, the reducing mixture was added rapidly into chloroauric acid. In order to verify the hypothesis, an experiment was performed by addition of chloroauric acid into tannic acid. The molar ratio was same as that used in previous experiments.

In a first experiment, 3 mL of 2.12 mM chloroauric acid was added instantaneously into 22 mL of 0.60 mM tannic acid. The hydrodynamic diameter of the nanoparticle synthesized was 8±1.9 nm and the diameter obtained from TEM image was 6.9±1.8 nm. This method of mixing reactants resulted in particles smaller than the addition of tannic acid into chloroauric acid which yielded particles of size 9.1±1.9 nm. By changing the mode of mixing reactants, the mean diameter of the nanoparticle synthesized decreased but the polydispersity remained higher.

In a second experiment, 10 mL of 0.64 mM chloroauric acid was added into 15 mL of 0.89 mM tannic acid at a rate of 1 ml/min. The experiment performed with slow addition of chloroauric acid resulted in nanoparticles of 6.2±0.8 nm, obtained from TEM image. Unexpectedly, the size of the nanoparticles obtained by slow addition is smaller than the instantaneous addition methods and possesses lower polydispersity.

Generally, slow addition of one of the reactants into a reducing and stabilizing mixture results in larger particles than the fast addition of precursor. In an investigation regarding the rate of addition of silver nitrate into PVP/ethylene glycol and its effect on the nature of particles synthesized, it was shown that fast addition of silver nitrate results in smaller particles with better polydispersity while slow addition results in larger particles. In a study on the effect of rate of addition of citrate into the chloroauric acid, it was shown that slow addition resulted in larger particles with high polydispersity. During the slow addition of one of the precursor, the reaction taking place during the initial phase of addition results in nucleation and later phase of addition of precursor aids the growth of the particle and thus results in bigger particle.

In the next experiment, 10 mL of 1.33 mM tannic acid was added slowly into 15 mL of 0.42 mM chloroauric acid solution at a rate of 1 ml/min. Unlike the slow addition of chloroauric acid, slow addition of tannic acid resulted in larger diameter particles. The hydrodynamic size of the nanoparticle obtained was 32±3.1 nm; the diameter obtained from TEM image was 25.3±8.1 nm.

It is clear that slow addition of chloroauric acid results in smaller nanoparticles with better polydispersity while slow addition of tannic acid results in bigger particles with higher polydispersity.

In another experiment, rapid mixing of the reactants, within ms, was achieved by utilizing the Berger ball set up in the stop flow reactor. The gold colloid was prepared in a stop flow apparatus using same molar ratio as that of instantaneous addition experiments. TEM images of nanoparticles indicated the diameter of the nanoparticle synthesized was 7.5±1.5 nm.

The diameter and polydispersity of the nanoparticles obtained by different method of mixing reactants is summarized in Table 4.

TABLE 4

Effect of method of mixing reactants on the nature of nanoparticles

| Method of mixing reactants | Diameter of nanoparticle (nm) | Standard deviation (nm) | Polydispersity (%) | Ratio of tannic acid to chloroauric acid at the end of nucleation S* |
|---|---|---|---|---|
| Slow addition of tannic acid | 25.3 | 8.1 | 32.0 | R/1800 |

TABLE 4-continued

Effect of method of mixing reactants on the nature of nanoparticles

| Method of mixing reactants | Diameter of nano-particle (nm) | Standard deviation (nm) | Poly-dispersity (%) | Ratio of tannic acid to chloroauric acid at the end of nucleation S* |
|---|---|---|---|---|
| Instantaneous addition of tannic acid | 9.1 | 1.9 | 20.9 | 0.33R |
| Rapid mixing (SFR) | 7.5 | 1.7 | 22.7 | R |
| Instantaneous addition of chloroauric acid | 6.9 | 1.8 | 26.1 | 3R |
| Slow addition of chloroauric acid | 6.1 | 0.6 | 10.0 | 1800R |

R-molar ratio of tannic acid to gold

Instantaneous addition of tannic acid gives larger diameter particles than the rapid mixing of reactants. Slow addition of tannic acid gives larger diameter particles than the instantaneous addition. The slow addition of tannic acid into the chloroauric acid gives bigger particles, as expected, in accordance with other reports. The TEM image also shows presence of irregular shaped particles indicating large extent of coalescence in these particles.

Surprisingly, instantaneous addition of chloroauric acid into the tannic acid gives smaller diameter nanoparticles than the nanoparticles obtained from the rapid mixing of reactants. Even more surprisingly, the slow addition of chloroauric acid produces nanoparticles of smallest size among different mode of mixing. The polydispersity of the particles produced by slow addition of chloroauric acid is decreased when compared to nanoparticles synthesized by other modes of mixing reactants. Further, the shape of the nanoparticles is spherical when compared to nanoparticles produces by other means.

The slow addition of the chloroauric acid would have been expected to have resulted in bigger nanoparticles, as discussed before. However, when coagulation of the particles is high, the final size of the nanoparticle can be determined by the extent of coagulation. Low polydispersity and spherical shape of the nanoparticles, synthesized by slow addition of chloroauric acid, indicates that the extent of coagulation in this way of mixing reactants is low. The extent of coagulation and the presence of stabilizer are factors in determining the size of nanoparticle.

In the synthesis of the gold nanoparticle discussed here, the tannic acid also acts as a stabilizer. The overall ratio of tannic acid to chloroauric acid remains the same in all cases after complete mixing of reactants but the ratio of tannic acid to chloroauric acid during the time period of nucleation varies in all these cases. The experiment conducted in the SFR shows that the time period of induction is 1 s. This time period of induction is the time taken for nucleation and further growth till the particle reaches a size which has observable absorbance, typically 2 nm for gold nanoparticle.

Based on a guideline that the nucleation time period can be assumed as one third of the induction time period, the nucleation time period is 0.33 s. The ratio of tannic acid to chloroauric acid, S*, available at 0.33 s after the start of reaction was calculated for all cases and is shown in Table 4. The ratio of tannic acid to chloroauric acid, at the end of nucleation, correlates well with the size of the nanoparticle obtained, that is at a higher stabilizer to chloroauric acid ratio, coagulation will be lower.

During the slow addition of the chloroauric acid, the number of nuclei formed at the end of nucleation will be less than the number of nuclei formed during the instantaneous addition. If the extent of the coagulation is the same in both cases then the slow addition will give larger particles than the instantaneous addition. But in the synthesis discussed here, the ratio S*, is also the ratio of the concentration of stabilizer to chloroauric acid. S* is high during the slow addition of chloroauric acid and thus prevents the coagulation from taking place during the initial phase of the synthesis. In the instantaneous addition of chloroauric acid, the S*, the ratio of stabilizer to chloroauric acid is low, resulting in a higher extent of coagulation, and thus bigger particles with higher polydispersity.

Example 8

Refined Protocol for Gold Nanoparticle Synthesis

These studies show that slow addition of metal precursor, chloroauric acid, into a pool of stabilizer unexpectedly produces nanoparticles of a smaller size with improved and lower polydispersity. The advantage of this method is that nanoparticles of size range 1-6 nm can be prepared by adding calculated amount of chloroauric acid. This process resembles a seeded growth approach and nanoparticles of different sizes, 2 nm to 6 nm, can be prepared by varying the amount of chloroauric acid. Further, nanoparticles of size ranging from 6 nm to 20 nm can be synthesized by varying the molar ratio of tannic acid to chloroauric acid.

Nanoparticles of size range 6 nm to 20 nm can also be synthesized by using a seeded growth technique. In seeded growth technique, nanoparticles of 6 nm are added to 15 mL of 0.89 mM tannic acid and 10 mL of 0.64 mM chloroauric acid was added drop by drop into growth solutions. By varying the volume of the seeds used, nanoparticles of different size can be prepared.

Example 9

Preparation of Silver Nanoparticles

Prior to use, Teflon parts and glassware were cleaned with aqua regia and rinsed with deionized water and dried in a laminar hood. A home built turbine and baffle system, made of Teflon®, designed to fit a 100 mL beaker, was used to provide a standardized mixing environment. Typically, 20 mL of required concentration of aqueous tannic acid (ACS reagent grade, Acros) at pH 8.0 (adjusted by adding $K_2CO_3$) was taken in the beaker. Then, 5 mL of 2.95 mM silver nitrate (GR grade, Merck) was added as one portion into the tannic acid solution, while stirring. The color of the solution changed from colorless to pale yellow, and the stirring was continued till there was no further change in color. For phase transfer into organic solvent, the pH of the as prepared silver colloid was adjusted to 4.0 by adding HCl and then mixed with equal volume of 0.8 µM ethanolic solution of dodecanethiol (AR grade, Sigma), and left undisturbed for 2 hours. The mixture was then centrifuged for 2 hrs at 3000 rpm, and the precipitate was dried in air. The dried precipitate could be easily redispersed in organic solvents.

Drop coated samples on carbon film grids or pre-cleaned silicon wafers were imaged using TEM (FEI-Tecnai F30 operated at 200 kV) and FESEM (Zeiss-Ultra55 operated at 15 kV) respectively. ImageJ™ software (Rasband, http://rsb.info.nih.gov/ij/ (1997-2008)) was used to report the nanoparticle size. UV-Vis spectra were recorded using a double beam spectrometer (Systronics, 2201). pH measurements were made using Orion™ pH electrode and benchtop meter.

Tannic acid has 25 phenolic —OH groups in its structure; but, only ten pairs of o-dihydroxyphenyl groups are capable of taking part in redox reactions to form quinones and donate electrons, due to chelating action of adjacent hydroxyl groups and constraints on carbon valency. So, each tannic acid molecule is capable of donating twenty electrons, which implies that a value of 0.05 for the molar ratio of tannic acid to silver nitrate (MR) will correspond to the stoichiometric requirement.

Figure 6:
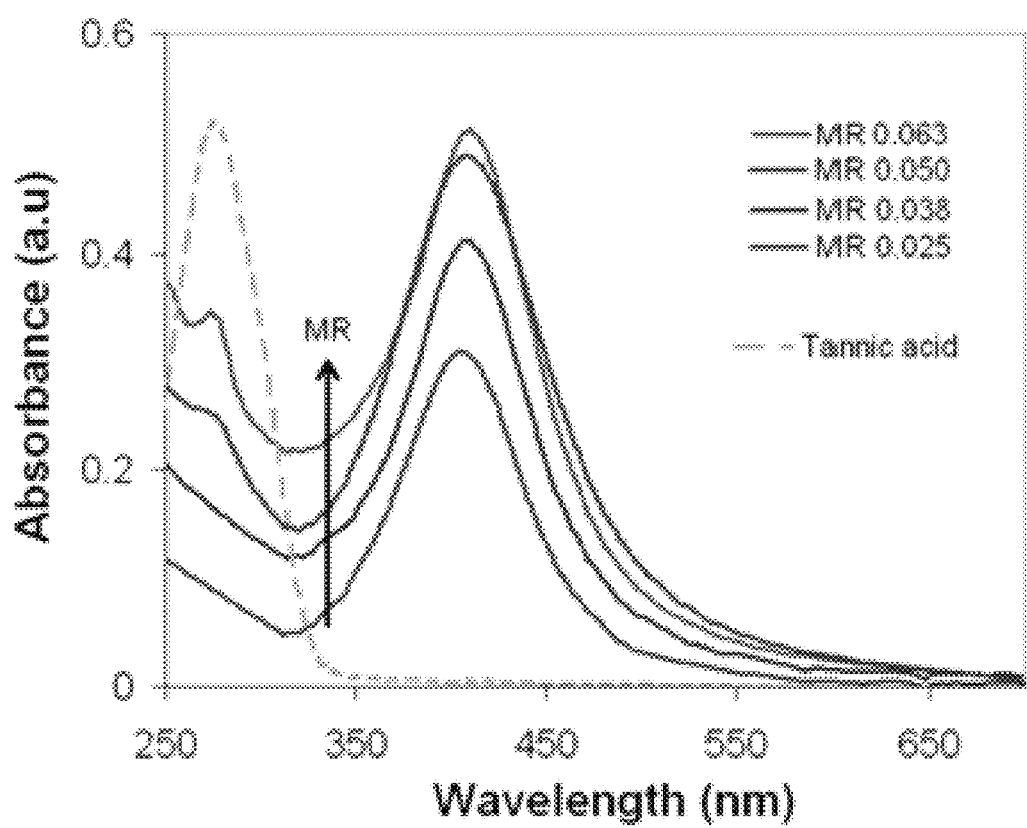
FIG. 6 is UV-Vis spectra of silver nanoparticle solutions as a function of the molar ratio (MR) of tannic acid to silver nitrate. The spectrum of a dilute tannic acid solution (dashed line) is shown for comparison.

FIG. 6 shows UV-Vis spectra of 0.25 mL aliquots sampled during the stepwise addition (corresponding to MR values) of tannic acid solution maintained at a pH of 8 to 5 mL of 2.95 mM silver nitrate solution. It is seen that the surface plasmon peak of silver nanoparticles at 420 nm increases steadily and then saturates at an MR value of 0.05, indicating that silver nitrate is completely reduced. Also, for MR values ≧0.05, a small shoulder at 270 nm is seen that is attributed to the presence of excess tannic acid. The spectrum of a dilute solution of pure tannic acid at pH 8 is also shown for comparison. These results validate the expected redox stoichiometry of tannic acid.

TABLE 5

Variation of time taken for color saturation and average particle size with the molar ratio of tannic acid to silver nitrate

| Molar ratio of tannic acid to silver nitrate | Time taken for color saturation (s) | Nanoparticle diameter (nm) ($\mu \pm \sigma$) |
| --- | --- | --- |
| 0.05 | 1 | 3.8 ± 1.5 |
| 0.50 | 20 | 16.1 ± 2.3 |
| 1.00 | 180 | 36.1 ± 6.1 |

We investigated the effect of increasing MR well above the stoichiometric requirement for reducing silver nitrate. In these experiments, the silver nitrate solution was added in one portion. Table 5 summarizes the results of particle size characterization and the visually determined time taken for color saturation after silver nitrate addition.

The trend of increasing nanoparticle size with increasing MR is opposite to that expected based on an assumption that increasing reagent concentration should increase reaction rates; thereby, resulting in higher supersaturation values and nucleation rates. In our case, however, the reaction rate (based on time taken for solution color to saturate—Table 5) and hence nucleation rate reduces with increasing MR. This implies that the role of tannic acid is not limited to that of reducing/stabilizing agent; for, even at alkaline pH, tannic acid has only moderate redox potential and should not nucleate silver nanoparticles at room temperature, just like hydroquinone.

Tannic acid can be thought of as a five-armed chelator that will be saturated with silver atoms at MR of 0.05 enabling rapid nucleation resulting in smaller particle size; while at a MR of 1, each tannic acid is on average ligated to only one silver atom and so, the nucleation rate will be decided by the interaction of such "unsaturated" compounds in solution leading to slower nucleation rate and larger particle sizes.

Finally, after successful phase transfer of the silver nanoparticles to an organic solvent using dodecanethiol as a capping agent, as described above, the silver nanoparticles can be self-assembled at an air-water interface. It was found that this phase transfer was successful only when the pH of the silver nanoparticle colloid was changed to 4. This is attributed to the weaker adsorption of stabilizing species at pH 4, facilitating displacement by dodecanethiol.

Tannic acid has been used as a reducing and stabilizing agent to synthesize silver nanoparticles through a simple, rapid, green, room temperature protocol. The concept of using tannic acid at alkaline pH as a reducing/organizing/stabilizing agent is easily extendable to many elements such as copper, gold, iron, lanthanides, manganese, palladium, platinum, zinc, etc. that are known to chelate with tannic acid.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for preparing metal or metal oxide nanoparticles comprising contacting (i) an aqueous metal precursor solution comprising a first metal precursor with (ii) an aqueous hydrolysable gallotannin solution under conditions suitable to form a nanoparticle solution comprising metal or metal oxide nanoparticles having a mean diameter of less than about 40 nm, wherein
the aqueous hydrolysable gallotannin solution has a pH in a range of about 6 to about 9.5; and
the hydrolysable gallotannin or hydrolysable gallotannin hydrolysis products are the only reducing agents and the only stabilizers present in the aqueous metal precursor solution and the aqueous hydrolysable gallotannin solutions.

2. The method of claim 1, wherein the contacting occurs at a temperature of about 10° C. to about 100° C.

3. The method of claim 1, wherein the metal or metal oxide nanoparticles have a diameter polydispersity of less than about 15%.

4. The method of claim 1, wherein the contacting occurs at a temperature of about 10° C. to about 40° C.

5. The method of claim 1, wherein the aqueous metal precursor solution comprises chloroauric acid and has a pH of about 0-5.

6. The method of claim 1, wherein the aqueous metal precursor solution comprises a silver salt and has a pH of about 6.5-7.0.

7. The method of claim 1, wherein metal or metal oxide nanoparticles are gold, silver, copper, platinum, platinum oxide, zinc, zinc oxide, iron oxide, palladium, manganese, or lanthanide nanoparticles.

8. The method of claim 1, wherein the contacting comprises adding the aqueous metal precursor solution to the aqueous hydrolysable gallotannin solution.

9. The method of claim 8, wherein the first aqueous metal precursor solution is added to the aqueous hydrolysable gallotannin solution at a rate of less than about 5.0 mL/min.

10. The method of claim 1, wherein the molar ratio of the hydrolysable gallotannin to the first metal precursor is about 0.01 to 20.

11. The method of claim 1, wherein the first metal precursor is present in the aqueous metal precursor solution at a concentration of less than about 10 mM and the hydrolysable gallotannin is present in the aqueous hydrolysable gallotannin solution at a concentration of less than about 10 mM.

12. The method of claim 1, further comprising exposing the metal or metal oxide nanoparticles to conditions suitable to remove from the metal or metal oxide nanoparticles a surface coating comprising the hydrolysable gallotannin, one or more a hydrolysis product of the hydrolysable gallotannin, or mixtures thereof.

13. The method of claim 12, further comprising, after removing the surface coating, contacting the metal or metal oxide nanoparticles with a third solution comprising one or more compounds capable of forming a coating on the surface of the metal or metal oxide nanoparticles.

14. The method of claim 13, wherein the metal or metal oxide nanoparticles are gold nanoparticles and the third solution comprises an alkylthiol.

15. The method of claim 1, wherein the molar ratio of the hydrolysable gallotannin and first metal precursor are selected to yield metal or metal oxide nanoparticles having a mean diameter of about 2-6 nm.

16. The method of claim 1, wherein the aqueous hydrolysable gallotannin solution further comprises metal or metal oxide nanoparticles having a mean diameter of about 2-10 nm.

17. The method of claim 1, wherein the aqueous hydrolysable gallotannin solution is prepared by dissolving a hydrolysable gallotannin in an aqueous solution and adjusting the pH of the aqueous solution to a range of about 6 to about 9.5.

18. The method of claim 1, the aqueous metal precursor solution comprises a second metal precursor, wherein the first and second metal precursors comprise different metals, and the metal or metal oxide nanoparticles comprise alloy nanoparticles.

19. The method of claim 1, further comprising contacting the nanoparticle solution with a second aqueous metal precursor solution comprising a second metal precursor, wherein the first and second metal precursors comprise different metals, and the metal or metal oxide nanoparticles comprise core-shell nanoparticles.

20. The method of claim 19, wherein the core-shell nanoparticles comprise core-shell Au—Ag, Ag—Au, Au—Pt, Pt—Au, Pd—Pt, or Pt—Pd nanoparticles.

* * * * *

UNITED STATES PATENT AND TRADEMARK OFFICE
CERTIFICATE OF CORRECTION

PATENT NO. : 8,361,188 B2  
APPLICATION NO. : 12/550210  
DATED : January 29, 2013  
INVENTOR(S) : Santhanam et al.

Page 1 of 1

It is certified that error appears in the above-identified patent and that said Letters Patent is hereby corrected as shown below:

On the Title Page:

Item (56), under "OTHER PUBLICATIONS", in Column 2, Line 20, delete "Chem," and insert -- Chem., --, therefor.

Item (56), under "OTHER PUBLICATIONS", in Column 2, Line 20, delete "34-38." and insert -- 34-38, --, therefor.

In the Specifications:

In Column 3, Line 12, delete "nm;" and insert -- nm. --, therefor.

In Column 3, Line 59, delete "liquids" and insert -- liquid --, therefor.

In Column 4, Line 10, delete "a iron" and insert -- an iron --, therefor.

In Column 10, Line 57, delete "nm" and insert -- nm. --, therefor.

In Column 12, Line 30, delete "correlation," and insert -- correlation. --, therefor.

In Column 14, Line 29, delete "base" and insert -- base. --, therefor.

In Column 14, Line 38, delete "Off" and insert -- OH⁻ --, therefor.

In Column 21, Line 36, delete "forth."" and insert -- forth. --, therefor.

In the Claims:

In Column 22, Line 50, in Claim 18, delete "the" and insert -- wherein the --, therefor.

Signed and Sealed this  
Twenty-third Day of April, 2013

Teresa Stanek Rea  
*Acting Director of the United States Patent and Trademark Office*